(12) United States Patent
Grislain et al.

(10) Patent No.: US 11,927,035 B2
(45) Date of Patent: Mar. 12, 2024

(54) SHEATH END PIECE FOR VEHICLE OPENING CABLE

(71) Applicant: U-SHIN FRANCE, Creteil (FR)

(72) Inventors: Jean-Baptiste Grislain, Abbeville (FR);
Herve Boucher, Abbeville (FR);
Francois Debroucke, Abbeville (FR)

(73) Assignee: U-SHIN FRANCE (FR)

( * ) Notice: Subject to any disclaimer, the term of this patent is extended or adjusted under 35 U.S.C. 154(b) by 210 days.

(21) Appl. No.: 17/082,495

(22) Filed: Oct. 28, 2020

(65) Prior Publication Data

US 2021/0123269 A1  Apr. 29, 2021

(30) Foreign Application Priority Data

Oct. 28, 2019  (FR) ..................... 19/12044

(51) Int. Cl.
*E05B 79/20*  (2014.01)

(52) U.S. Cl.
CPC ......... *E05B 79/20* (2013.01); *E05Y 2201/654* (2013.01); *E05Y 2600/46* (2013.01); *E05Y 2900/531* (2013.01)

(58) Field of Classification Search
CPC ............... E05B 79/20; E05Y 2201/654; E05Y 2600/46; E05Y 2900/531
See application file for complete search history.

(56) References Cited

U.S. PATENT DOCUMENTS

| | | | | |
|---|---|---|---|---|
| 6,178,845 | B1 * | 1/2001 | Gutschner | F16C 1/105 74/501.5 R |
| 7,225,702 | B2 * | 6/2007 | Fannon | F16C 1/262 74/502.6 |
| 2006/0048598 | A1 * | 3/2006 | Roussel | F16C 1/262 74/502.6 |
| 2016/0060908 | A1 * | 3/2016 | Kim | E05B 79/20 292/336.3 |
| 2021/0175660 | A1 * | 6/2021 | Bishop | E05B 79/00 |

FOREIGN PATENT DOCUMENTS

| | | | | |
|---|---|---|---|---|
| DE | 102004023867 | | 11/2005 | |
| DE | 102017105827 | | 9/2018 | |
| EP | 0239984 | | 10/1987 | |
| EP | 0260900 | | 3/1988 | |
| EP | 260900 | A * | 3/1988 | ............. F16C 1/105 |
| FR | 3057643 | | 4/2018 | |
| FR | 3057643 | A1 * | 4/2018 | ............. F16C 1/105 |
| KR | 20180032462 | A * | 3/2018 | ............. E05B 79/20 |
| WO | WO-2012052493 | A1 * | 4/2012 | ............. E05B 79/20 |

* cited by examiner

*Primary Examiner* — Kristina R Fulton
*Assistant Examiner* — James Edward Ignaczewski
(74) *Attorney, Agent, or Firm* — Burris Law, PLLC

(57) ABSTRACT

A sheath end piece of a connecting element that connects two vehicle door opening devices includes a base, a mounting element, and a dismounting element. The connecting element includes a cable which is partially covered with a sheath. The base is mounted on an end portion of the sheath and includes a fastening interface to permit the mounting and dismounting of the connecting element on one of the two door opening devices. The mounting element permits exerting a pressure on the fastening interface so as to permit the mounting of the connecting element. The dismounting element permits exerting a traction on the fastening interface so as to permit the dismounting of the connecting element. At least one of the mounting element and the dismounting element protrudes from the base.

18 Claims, 3 Drawing Sheets

[Fig. 1]
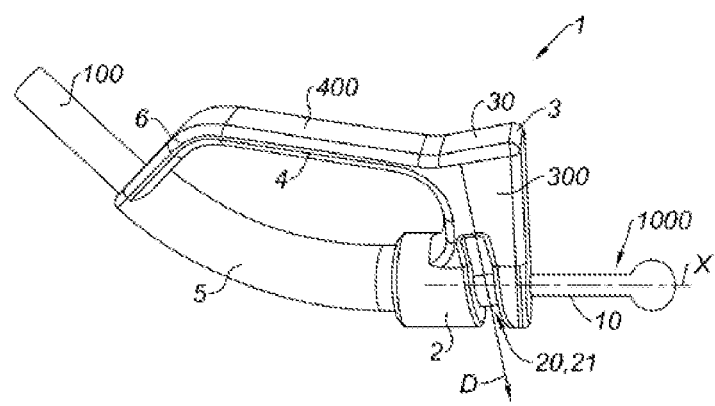
[Fig. 2]
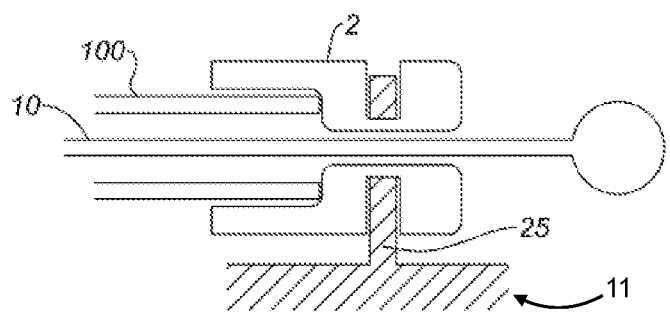
[Fig. 3]
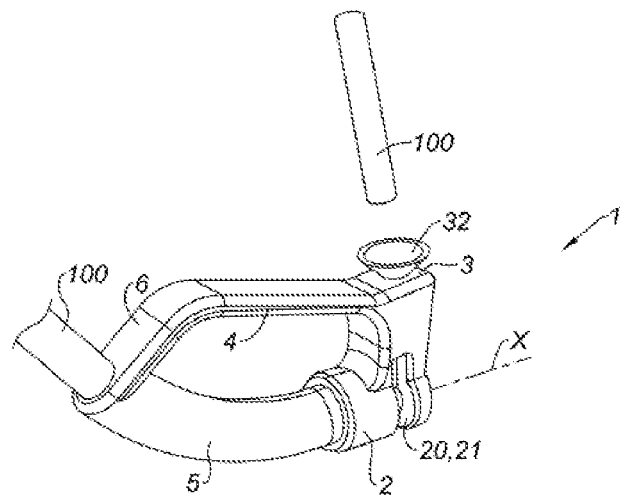

[Fig. 4]
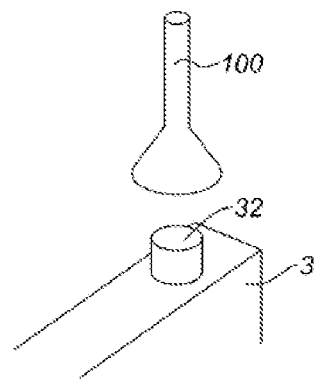
[Fig. 5]
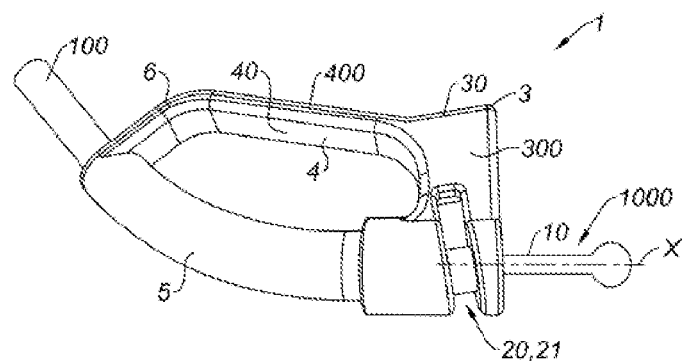
[Fig. 6]
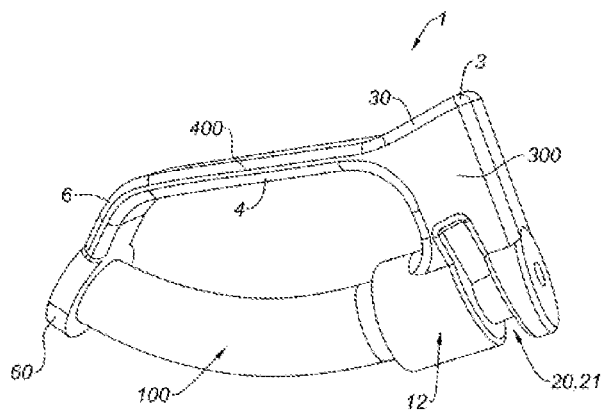

[Fig. 7]
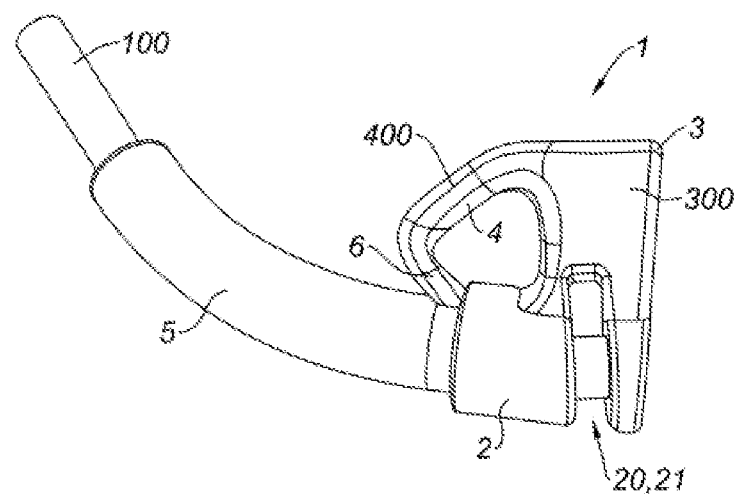
[Fig. 8]
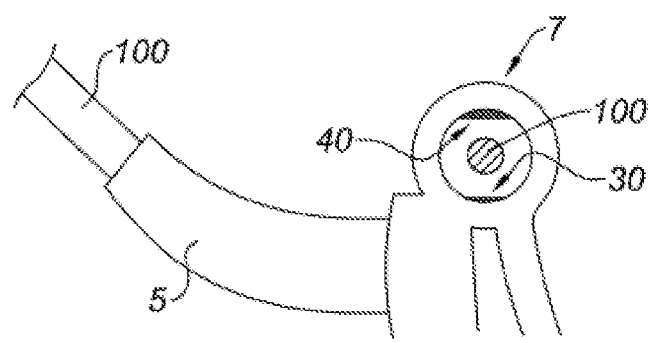

SHEATH END PIECE FOR VEHICLE OPENING CABLE

CROSS-REFERENCE TO RELATED APPLICATIONS

This application claims priority to and the benefit of FR 19/12044, filed on Oct. 28, 2019. The disclosures of the above applications are incorporated herein by reference.

FIELD

The present disclosure relates to the automotive field, more particularly to the field of motor vehicle door opening devices and provides, in particular, a sheath end piece for a motor vehicle door opening cable and a connecting element including a cable and the sheath end piece.

BACKGROUND

The statements in this section merely provide background information related to the present disclosure and may not constitute prior art.

Generally, motor vehicle door opening devices include a door handle and a latch which are connected to each other and which cooperate with each other to open the door of the vehicle via a connection, which is for example flexible, commonly called "cable." The cable is generally connected, on the one end, to the latch and, on the other end, to the door handle. Thus, when a user actuates the door handle, the cable transmits the force exerted on the handle to actuate the latch, so as to open the door. The connection can also be rigid and is, in this case, commonly called a "rod." These connections can also be used in brakes, accelerators, gearboxes of motor vehicles.

A flexible connection generally includes a cable covered with a sheath and two sheath end pieces, each disposed at one end of the sheath. These sheath end pieces, also referred to as "sheath stop" allow handling the cable and fastening it to the opening device.

However, typical sheath end pieces do not allow easy handling of the sheath end piece and, consequently of the cable, for example for fastening the sheath end piece by clipping which generally requires having to carry out several movements to be able to fasten it to the opening device.

A drawback of typical sheath end pieces therefore lies in the difficulty of handling them, which makes the operation of mounting the cable on the opening device difficult.

In the same manner, it is sometimes necessary to remove the opening device from the door of the vehicle for maintenance operations, for example, and in this case it is necessary to be capable of easily dismounting the cable from the opening device. When the mounting and dismounting of the cable is operated blindly, it becomes all the more important to allow easy handling to assist in the mounting and dismounting of this cable. In some cases, it is even necessary to have a tool, for example a hook, in order to dismount the cable from the opening device.

There is therefore a need to facilitate the handling of the sheath end pieces.

SUMMARY

This section provides a general summary of the disclosure and is not a comprehensive disclosure of its full scope or all of its features.

The present disclosure aims in particular at overcoming, at least in part, one of these drawbacks and concerns according to a first aspect a sheath end piece for a connecting element configured to connect two vehicle door opening devices, the connecting element including a cable which is partially covered with a sheath, the sheath end piece including:

a base configured to be mounted on an end portion of the sheath and including a fastening interface to allow the mounting/dismounting of the connecting element on one of the two door opening devices, a mounting element configured to allow exerting a pressure on the fastening interface so as to allow the mounting of the connecting element on the vehicle door opening device, and a dismounting element configured to allow exerting a traction on the fastening interface so as to allow the dismounting of the connecting element of the vehicle door opening device, the mounting element and/or the dismounting element protruding from the base.

Thus, thanks to the sheath end piece according to the teachings of the present disclosure, the operations of mounting and dismounting the cable on the opening device are facilitated and can be accurately carried out.

As used herein, the term "vehicle opening device" means a vehicle door handle or a vehicle door latch.

As used herein, the term "end portion of the sheath" means a portion including an edge of the sheath, a free end of the sheath.

The mounting of the cable on the vehicle door opening device is carried out when a pressure is exerted on the fastening interface via the mounting element. The pressure can be exerted by a user, directly or indirectly.

The dismounting of the cable on the vehicle door opening device is carried out when a traction is exerted on the fastening interface via the dismounting element. The traction can be exerted by a user, directly or indirectly.

As used herein, the term "protruding" means that the mounting element and/or the dismounting element are disposed at a distance from the base.

The sheath end piece of the present disclosure includes one or more of the following optional features considered alone or according to any possible combination.

According to one feature, the mounting element is fastened to the base.

According to one feature, the dismounting element is fastened to the base.

As used herein, the term "fastening an element to the base" means that an element is secured to the base. The element can be attached or mounted on the base, or even made in one piece with the base, for example made in one piece with the base. In general, the term "fastening between two elements," as used herein, means that the two elements are secured to each other, that they can be attached or mounted on each other, or made in one piece, for example are integral with each other.

According to one feature, the mounting element includes a bearing surface. As used herein, the term "bearing surface" means a surface on which a user can exert a pressure.

According to one feature, the bearing surface is substantially perpendicular to a mounting direction corresponding to the direction in which the pressure is exerted.

The fastening interface defines, by the orientation thereof, the mounting direction which is substantially parallel to the direction of the pressure exerted on the bearing surface and the bearing surface. The mounting direction is therefore substantially orthogonal to the bearing surface. This configuration allows aligning the forces applied from the bearing surface to the fastening interface and easily assembling the cable on the opening device, for example by clipping.

According to a variant, the bearing surface is flat. Thus, the mounting element has optimal ergonomics for manual mounting operations, that is to say, without tooling, in particular when the user exerts a pressure by pushing on the surface to mount the cable on the device.

According to a variant, the mounting element includes a docking element including a portion for receiving a tooling by which pressure can be exerted to allow the mounting of the sheath end piece on the door opening device. For example, the receiving portion is conical in shape. According to one variant, the receiving portion is cylindrical in shape. Thus, the mounting element has optimal ergonomics for mounting operations by means of a tooling whose use may be necessary, in particular in areas that are difficult to access.

According to one feature, the dismounting element includes a traction surface. As used herein, the term "traction surface" means a surface on which a user can exert a traction.

According to a variant, the traction surface is flat. Thus, the dismounting element has optimal ergonomics for dismounting operations, in particular manual.

According to one feature, the traction surface and the bearing surface are substantially opposite to each other.

According to one feature, the sheath end piece includes a mounting arm extending from the base in a first direction, the mounting arm carrying the mounting element, and a dismounting arm extending from the mounting arm in a second direction, inclined relative to the first direction, the dismounting arm carrying the dismounting element.

For example, the first direction is substantially parallel to the mounting direction.

It is understood that the dismounting arm is disposed at a distance from the base.

According to one feature, the base is disposed around the sheath. For example, the mounting arm can extend substantially radially relative to the base. In other words, the first direction can be substantially perpendicular to a longitudinal axis of the base. For example, the base is cylindrical. As used herein, the term "a second direction inclined relative to the first direction" means that the dismounting arm extends from the mounting arm with an inclination included between 80° and 100°. In one example, the inclination is between 85° and 95°. In another example, the inclination is equal to 90°.

According to one feature, the mounting element is disposed at a distal end of the mounting arm, opposite to a proximal end of the mounting arm fastened to the base. This arrangement of the mounting element relative to the base allows optimizing the direction of the pressure forces and allows optimally guiding the cable when it is mounted on the opening device.

According to one feature, the traction surface is disposed facing the base. This arrangement of the surface of the dismounting element allows optimizing the direction of the tensile forces so as to allow an optimal dismounting of the cable from the opening device.

According to one feature, the sheath end piece includes a reinforcing arm including a first end connected to the dismounting arm. The reinforcing arm allows stiffening the structure of the sheath end piece.

According to a variant, the reinforcing arm includes a second end opposite to the first end, the second end being connected to the base. Thus, the mounting arm, the dismounting arm and the reinforcing arm form a passage configured to receive a tooling for dismounting operations by means of the tooling. The sheath end piece thus has optimal ergonomics for dismounting operations using a tooling.

According to a variant, the sheath end piece includes a junction element configured to be mounted on the sheath, the second end of the reinforcing arm being fastened to the junction element. The junction element is configured to be mounted on the sheath, at a distance from the base. Thus, the mounting arm, the dismounting arm and the reinforcing arm form a passage configured to receive at least one finger of the user to allow a manual gripping of the dismounting element in order to exert a traction thereon. The sheath end piece thus has optimal ergonomics for manual dismounting operations.

According to one feature, the base is configured to be mounted on the end portion of the cable by punching. The punching, also called "clinching," or "assembly-stamping," is a mode of mechanical connection between a first part and a second part which consists in making the material of a first part penetrate into the material of a second part, that is to say which consists of an nesting of the material of the first part in the material of the second part. Thus, it is possible to attach and fasten the sheath end piece on the sheath of the cable.

According to one feature, the sheath end piece includes a reinforcing element configured to cover a portion of the sheath, the reinforcing element being disposed in the extension of the base. The reinforcing element allows reinforcing the mechanical strength between the sheath end piece and the sheath of the cable.

In another form, a connecting element for vehicle door opening devices includes:

a cable which is partially covered with a sheath;

at least one sheath end piece as previously described, the sheath end piece being mounted on an end portion of the sheath.

According to one feature, the cable is movable relative to the sheath. For example, the cable can slide into the sheath.

Other features and advantages of the present disclosure will be apparent from the following non-limiting description and the figures which schematically illustrate several configurations of the sheath end piece according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is an isometric view of a sheath end piece according to the teachings of the present disclosure;

FIG. 2 is a cross-sectional view of the sheath end piece of FIG. 1;

FIG. 3 is a perspective view of a sheath end piece of a second configuration according to the teachings of the present disclosure;

FIG. 4 is a perspective view of a portion of a sheath end piece of a third configuration according to the teachings of the present disclosure;

FIG. 5 is a perspective view of a sheath end piece of a fourth configuration according to the teachings of the present disclosure;

FIG. 6 is a perspective view of a sheath end piece of a fifth configuration according to the teachings of the present disclosure;

FIG. 7 is a perspective view of a sheath end piece of a sixth configuration according to the teachings of the present disclosure; and FIG. 8 is a cross-sectional view of a sheath end piece of a seventh configuration according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For the sake of simplification, identical elements are marked by identical reference signs in all figures and only differences are described in detail herein.

Referring to FIG. 1, a sheath end piece 1 is mounted on an end portion of a sheath 100 of a cable 10. The cable 10, the sheath and the sheath end piece 1 form a connecting element between two vehicle door opening devices.

The cable 10 is configured to transmit a force between the two opening devices, for example between a door handle and a latch. The cable 10 includes, at one end, a force transmission interface 1000 configured to be connected to a first vehicle door opening device 11 (FIG. 2), for example a latch, and a second force transmission interface arranged at a second end of the cable (not shown), opposite to the first end, the second transmission interface being configured to be connected to a second vehicle door opening device (not shown), for example the handle. The force transmission interfaces 1000 therefore allow the transmission of the force between the vehicle door opening devices.

The cable 10 is partially covered with the sheath 100. In other words, the cable 10 is covered with a sheath 100 over a portion of its length. The cable 10 is movable inside the sheath 100 so as to control the opening of the door (not shown) by transmitting a tensile force from the handle (not shown) to the latch 11 (FIG. 2). The sheath 100 is configured to guide the cable 10 and also protects it from damage related to the hooking of the cable during its dismounting. For example, the sheath 100 can include a metal frame coated with a plastic coating which may have a thickness of 0.5 mm.

The sheath end piece 1 is mounted on an end portion of the sheath 100 of the cable 10 and allows fastening the cable 10 to the opening device 11 (FIG. 2). The sheath end piece 1 includes a base 2, directly mounted on the end portion of the sheath 100. The base 2 is therefore configured to fasten the sheath end piece 1 on the sheath 100. In the present configuration, base 2 is cylindrical and extends along a longitudinal axis X around the sheath 100 of the cable 10.

The sheath end piece 1 includes a first fastening interface 20. The fastening interface 20 allows immobilizing the sheath end piece 1 on the opening device 11 (FIG. 2) and providing it with a mechanical resistance to pullout forces.

As illustrated in FIG. 2, the opening device 11 includes a second fastening interface 25. The first and second fastening interfaces 20, 25 are configured to cooperate in a form-fitting manner.

In the represented example, the first fastening interface 20 of the sheath end piece 1 includes a groove 21. The groove 21 is formed in the base 2 of the sheath end piece 1. In the examples represented in FIGS. 1, 3, 6 and 7, the groove 21 is closed. As used herein, the term "closed groove" means a groove which extends over a portion of the circumference of the base 2. In the represented example, the groove 21 extends over about 355° of the circumference. The closed groove 20 is capable of cooperating with the second fastening interface 25 of the opening device 11. The second fastening interface 25 may include an open cylinder forming two jaws configured to be engaged into the groove 21. The second fastening interface 25 is elastically deformable so as to be able to be engaged with the first fastening interface 20 in a form-fitting manner. In the represented example, the jaws can therefore be deformed in order to be able to be inserted around the groove 21 of the sheath end piece 1. For example, the second fastening interface 25 can include at least one retaining element, configured to generate friction between the second fastening interface 25 and the first fastening interface 20, allowing avoiding the disengagement of the fastening interface 25 in the groove 21. The retaining element thus forms a hard point. The retaining element may include two portions protruding inwardly of the cylinder, from each of the ends of the jaws, preferably the ends proximal to the opening of the open cylinder. The closed groove allows preventing a rotation of the cable 10 about the longitudinal axis X when the cable is mounted on the opening device 11, and enables a low angular flapping included between 0° and 5°.

According to a variant, represented in FIG. 5, the groove 21 is open and therefore extends over the entire circumference of the base 2.

In a configuration which is not represented, the base 2 can be devoid of the groove 21 and present itself the fastening interface 25 including the two jaws. In one form, the opening device 11 may have a complementary fastening interface such as a groove. The jaws of the base 2 can be deformed when fastening the base 2 on the groove which is present on the opening device 11.

The sheath end piece further includes a mounting element 3 configured to allow a mounting of the cable 10 on the vehicle door opening device (not represented) via the fastening interfaces. The mounting element 3 is protruding from the base 2 via a mounting arm 300 which extends substantially radially relative to the base 2.

In the present example, the mounting element 3 includes a bearing surface 30 on which the user can exert a pressure so as to engage the first and second fastening interfaces. Indeed, when the user exerts a pressure on the bearing surface 30, the jaws of the second fastening interface are deformed and move away from each other so as to be engaged in the groove 21, about the circumference thereof.

The bearing surface 30 is disposed at a distal end of the mounting arm 300, opposite to a proximal end of the mounting arm 300 fastened to the base 2. Thus, the user can exert a pressure on the bearing surface 30 which allows displacing the sheath end piece 1 towards the second fastening interface such that the two fastening interfaces cooperate.

In the present example, the bearing surface 30 is flat and is optimally oriented relative to the base 2 and the groove 20.

This orientation allows the user to accurately guide the cable 10 during its mounting on the opening device.

Indeed, the fastening interface is oriented in a mounting direction D which is substantially parallel to the direction of the pressure exerted on the bearing surface 30. The bearing surface 30 is oriented perpendicular to the mounting direction D.

Thus, the force applied to the bearing surface 30 is oriented along the mounting direction D. The force direction and the mounting direction are coincident, and thus allow easily assembling the cable 10 on the opening device.

In the present example, the base 2, the mounting element 3 and the mounting arm 300 are integrally formed, that is to say they are formed in one piece.

FIG. 3 illustrates a variant of the mounting element 3 in which the mounting element 3 includes a docking element 32. The docking element 32 includes a portion for receiving a tooling 100 by which pressure can be exerted to allow the mounting of the sheath end piece 1 on the door opening device. This docking element 32 allows receiving and guiding a mounting tooling 100 when the user carries out an operation for mounting the cable by means of the tooling 100. In the present example, the receiving portion is conical in shape.

The docking element 32 is not limited to a conical shape and can have any shape which is suitable for guiding and holding the tooling 100 in the mounting element 3 such as recessed or raised shapes. FIG. 4 illustrates a variant in which the portion for receiving the docking element 32 is cylindrical in shape.

The sheath end piece 1 further includes a dismounting element 4 which is adjacent to the mounting element 3. The dismounting element 4 is configured to allow a dismounting of the cable 10 from the opening device. The dismounting element 4 is arranged on a dismounting arm 400 which extends from the distal end of the mounting arm 30 in a direction perpendicular to this arm 30. In other words, the dismounting arm 400 extends parallel to the longitudinal axis X of the base 2.

The dismounting arm 4 is fastened to the base 2 via the mounting arm 300 and forms, with the base 2 and the mounting arm, a passage configured to receive at least one finger of a user so as to allow a manual gripping of the dismounting element 4.

In the present example, the dismounting arm 400 and the dismounting element 4 are integral with the mounting arm 300.

As illustrated in FIG. 5, the dismounting element 4 includes a traction surface 40 on which the user can exert a traction with the user's fingers for example. The traction surface 40 is flat and is disposed facing the base 2 and the fastening interface 20 so as to allow optimizing the direction of the tensile forces during the dismounting of the cable 10 from the latch or the handle.

The traction surface 40 of the dismounting element 4 and the bearing surface 30 of the mounting element 3 are substantially opposite to each other.

As illustrated in FIGS. 1, 3 and 5, the sheath end piece 1 includes a reinforcing element 5. The reinforcing element 5 is connected at one of the ends thereof to the base 2 and extends into the extension of the base 2 around the sheath 100 of the cable 10 so as to cover the end portion of the sheath 100 of the cable 10 on which the sheath end piece 1 is mounted. The reinforcing element 5 allows reinforcing the mechanical strength between the sheath end piece 1 and the sheath 100 of the cable 10. In the present example, the reinforcing element 5 has a curvature which allows orienting the sheath 100 relative to the fastening interface 20. In the present example, the reinforcing element 5 is integral with the base 2. In the present example, the reinforcing element 5 and the base 2 are overmolded onto the sheath 100 of the cable 10.

FIG. 6 illustrates a variant in which the sheath end piece is devoid of the reinforcing element 5.

The sheath end piece 1 includes a reinforcing arm 6. The reinforcing arm 6 is designed to stiffen the structure of the sheath end piece 1. The reinforcing arm 6 is connected, at one of the ends thereof, to the dismounting arm 400 and, at the opposite end thereof, to the reinforcing element 5, in the exemplary configuration in which the sheath end piece 1 includes a reinforcing element. The reinforcing arm 6 is connected to the end of the reinforcing element 5, opposite to the end of the reinforcing element 5 which is fastened to the base 2.

In the present example, the reinforcing arm 6 is integral with the dismounting arm 400 and the reinforcing element 5.

In the example represented in FIG. 6, in which the sheath end piece 1 is devoid of a reinforcing element 5, the reinforcing arm 6 of the sheath end piece 1 includes a junction element 60. The junction element 60 is disposed at the end of the reinforcing arm 6, opposite to the end which is connected to the dismounting arm 400. The junction element 60 is mounted on the sheath 100 of the cable 10 at a distance from the base 2 so that the user can insert at least one finger on the traction surface 40 of the dismounting element 4.

In the represented exemplary configurations, the different elements of the sheath end piece 1 are integral.

Thus, the sheath end piece 1 can be made by injection and then attached and fastened to the end portion of the sheath 100 by a mechanical connection operation, for example by punching. Anchor points are made about the circumference of the sheath 100 so as to anchor the material of the sheath end piece 1 in the material of the sheath 100 at these anchor points. The anchor points are distributed evenly so as to obtain a distribution of the loads. The number of anchoring points can depend on the desired mechanical strength between the sheath 100 and the sheath end piece 1. An increase in the number of anchor points can increase the mechanical strength between the sheath 100 and the sheath end piece 1.

FIG. 7 illustrates the sheath end piece 1 in which the second end of the reinforcement arm 6 opposite to the end which is connected to the dismounting arm 400, is connected to the base 2. In this configuration, the mounting arm 300, the dismounting arm 400 and the reinforcing arm 6 form, with the base 2, a passage adapted to receive a tooling (not represented) for operations of dismounting the cable 10 by means of the tooling. The sheath end piece 1 thus has optimal ergonomics for dismounting operations using a tooling.

According to a variant which is illustrated in FIG. 8, the mounting arm 300, the dismounting arm 400 and the reinforcing arm 6 form a ring in which a tooling 100 can be inserted allowing the mounting/dismounting of the cable 10. In this variant, the bearing surface 30 is arranged on the base 20 and the traction surface is protruding from the base 20. The bearing surface 30 and the traction surface 40 are disposed facing each other.

The teachings of the present disclosure are not limited to the examples which have just been described and numerous arrangements can be attributed to these examples without departing from the scope of the present disclosure. In particular, the different features, shapes, variants, examples, forms, and configurations of the present disclosure can be associated with each other according to various combinations as long as they are not incompatible or exclusive with each other. In particular, all previously described variants, examples, forms, and configurations can be combined with each other.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are configured to be within the scope of the disclosure. Such variations are not to be regarded as a departure from the spirit and scope of the disclosure.

What is claimed is:

1. A sheath end piece for a connecting element configured to connect two vehicle door opening devices, the connecting element comprising a cable which is partially covered with a sheath, the sheath end piece comprising:
   a base disposed about an axis and configured to be mounted coaxially on an end portion of the sheath, the base including a fastening interface disposed at least partially on a first side of the axis, the fastening interface being configured to permit mounting and dismounting of the connecting element on one of the two door opening devices;
   a mounting element coupled to the base on a second side of the axis, the second side of the axis being diametrically opposite of the first side, the mounting element being configured to allow exerting a pressure on the fastening interface so as to mount the connecting element on the one of the two vehicle door opening devices;
   a dismounting element disposed on the second side of the axis and configured to allow exerting a traction on the fastening interface so as to dismount the connecting element from the one of the two vehicle door opening devices;
   a mounting arm extending from the base in a first direction, the mounting arm carrying the mounting element; and
   a dismounting arm extending directly from the mounting arm in a second direction, inclined relative to the first direction, the dismounting arm carrying the dismounting element,
   wherein at least one of the mounting element and the dismounting element protrude from the base.

2. The sheath end piece according to claim 1, wherein the mounting element comprises a bearing surface.

3. The sheath end piece according to claim 2, wherein the bearing surface is substantially perpendicular to a mounting direction corresponding to a direction in which the pressure is exerted on the fastening interface.

4. The sheath end piece according to claim 1, wherein the dismounting element comprises a traction surface.

5. The sheath end piece according to claim 4, wherein the mounting element comprises a bearing surface, wherein the traction surface and the bearing surface face in directions that are substantially opposite to each other.

6. The sheath end piece according to claim 1, wherein the mounting element is disposed at a distal end of the mounting arm, opposite to a proximal end of the mounting arm fastened to the base.

7. The sheath end piece according to claim 1, wherein the traction surface is disposed facing the base.

8. The sheath end piece according to claim 1, comprising a reinforcing arm, the reinforcing arm comprising a first end connected to the dismounting arm.

9. The sheath end piece according to claim 8, wherein the reinforcing arm comprises a second end opposite to the first end, the second end being connected to the base.

10. The sheath end piece according to claim 8, comprising a junction element configured to be mounted on the sheath, the second end of the reinforcing arm being fastened to the junction element.

11. The sheath end piece according to claim 10, wherein the base is configured to be mounted on the end portion of the sheath of the cable by punching.

12. The sheath end piece according to claim 1, comprising a reinforcing element configured to cover a portion of the sheath, the reinforcing element being disposed in an extension of the base.

13. A connecting element for connecting a first vehicle door opening device with a second vehicle door opening device, the connecting element comprising:
   a cable, partially covered with a sheath; and
   at least one sheath end piece comprising:
      a base disposed about an axis and mounted coaxially to the sheath on an end portion of the sheath and including a fastening interface disposed at least partially on a first side of the axis, the fastening interface being configured to permit mounting and dismounting of the connecting element on the first door opening device;
      a mounting element coupled to the base on a second side of the axis, the second side of the axis being diametrically opposite the first side, the mounting element being configured to allow exerting a pressure on the fastening interface so as to mount the connecting element on the first vehicle door opening device; and
      a dismounting element disposed on the second side of the axis and configured to allow exerting a traction on the fastening interface so as to dismount the connecting element from the first vehicle door opening device;
      a mounting arm extending from the base in a first direction, the mounting arm carrying the mounting element; and
      a dismounting arm extending directly from the mounting arm in a second direction, inclined relative to the first direction, the dismounting arm carrying the dismounting element,
   wherein at least one of the mounting element and the dismounting element protrude from the base.

14. The connecting element according to claim 13, wherein the cable is movable relative to the sheath.

15. The sheath end piece according to claim 1, wherein the mounting element and the dismounting element are coupled to the base such that the mounting and dismounting elements are non-movable relative to the base.

16. The connecting element according to claim 13, wherein the mounting element and the dismounting element are coupled to the base such that the mounting and dismounting elements are non-movable relative to the base.

17. The sheath end piece according to claim 1, wherein the fastening interface defines a groove open through a side of the base that is on the first side of the axis, the groove being configured to receive one of the two vehicle door opening devices to permit mounting and dismounting of the one of the two vehicle door opening devices.

18. The connecting element according to claim 13, wherein the fastening interface defines a groove open through a side of the base that is on the first side of the axis, the groove being configured to receive the first vehicle door opening device to permit mounting and dismounting of the first vehicle door opening device.

* * * * *